July 30, 1957  E. HART  2,800,722
DEVICE FOR DETERMINING THE CUTTING FACE ANGLES ON TAPS
Filed Feb. 25, 1954  3 Sheets-Sheet 1
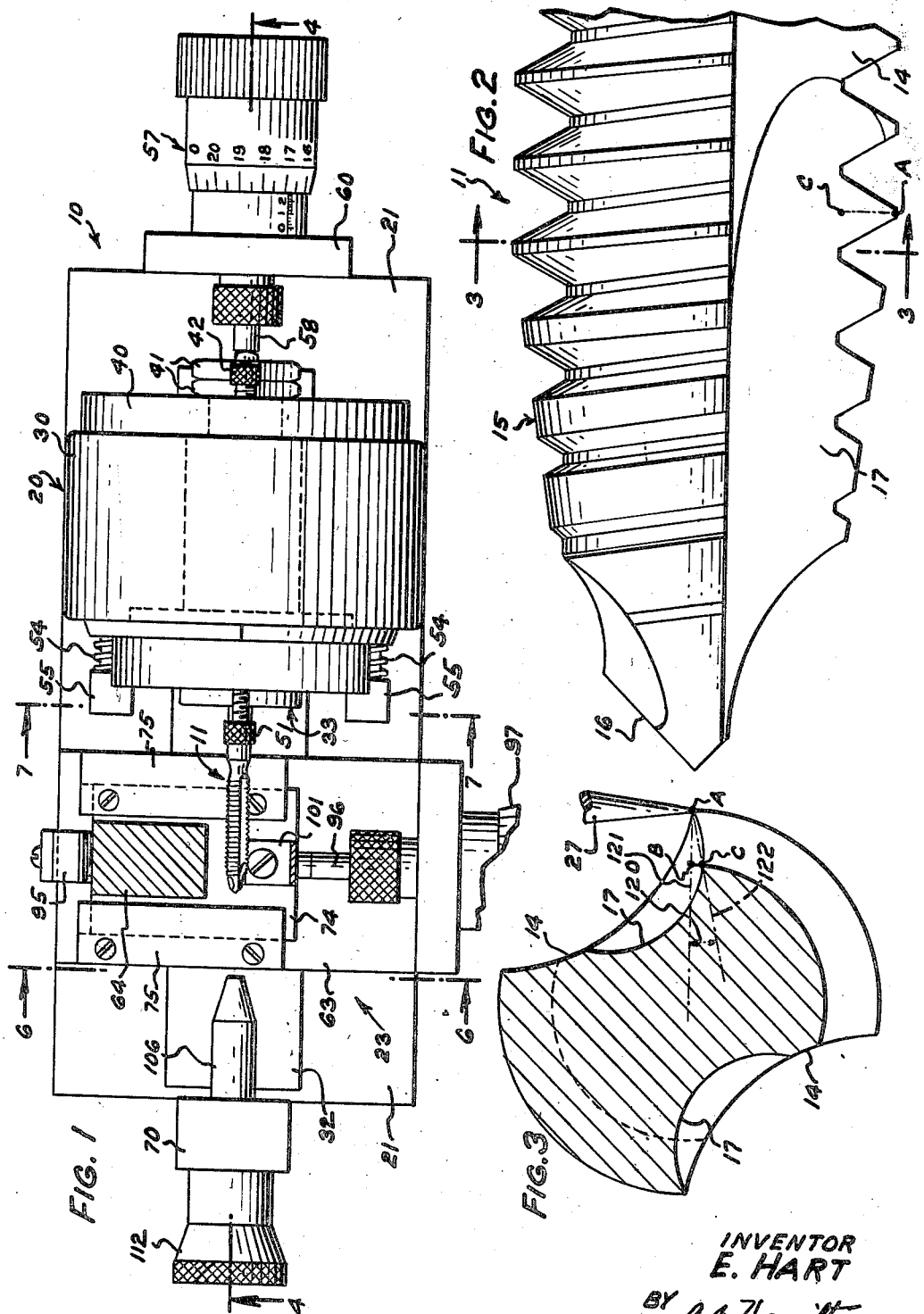
INVENTOR
E. HART
BY C. B. Hamilton
ATTORNEY July 30, 1957  E. HART  2,800,722
DEVICE FOR DETERMINING THE CUTTING FACE ANGLES ON TAPS
Filed Feb. 25, 1954  3 Sheets-Sheet 2

INVENTOR
E. HART
BY C. B. Hamilton
ATTORNEY

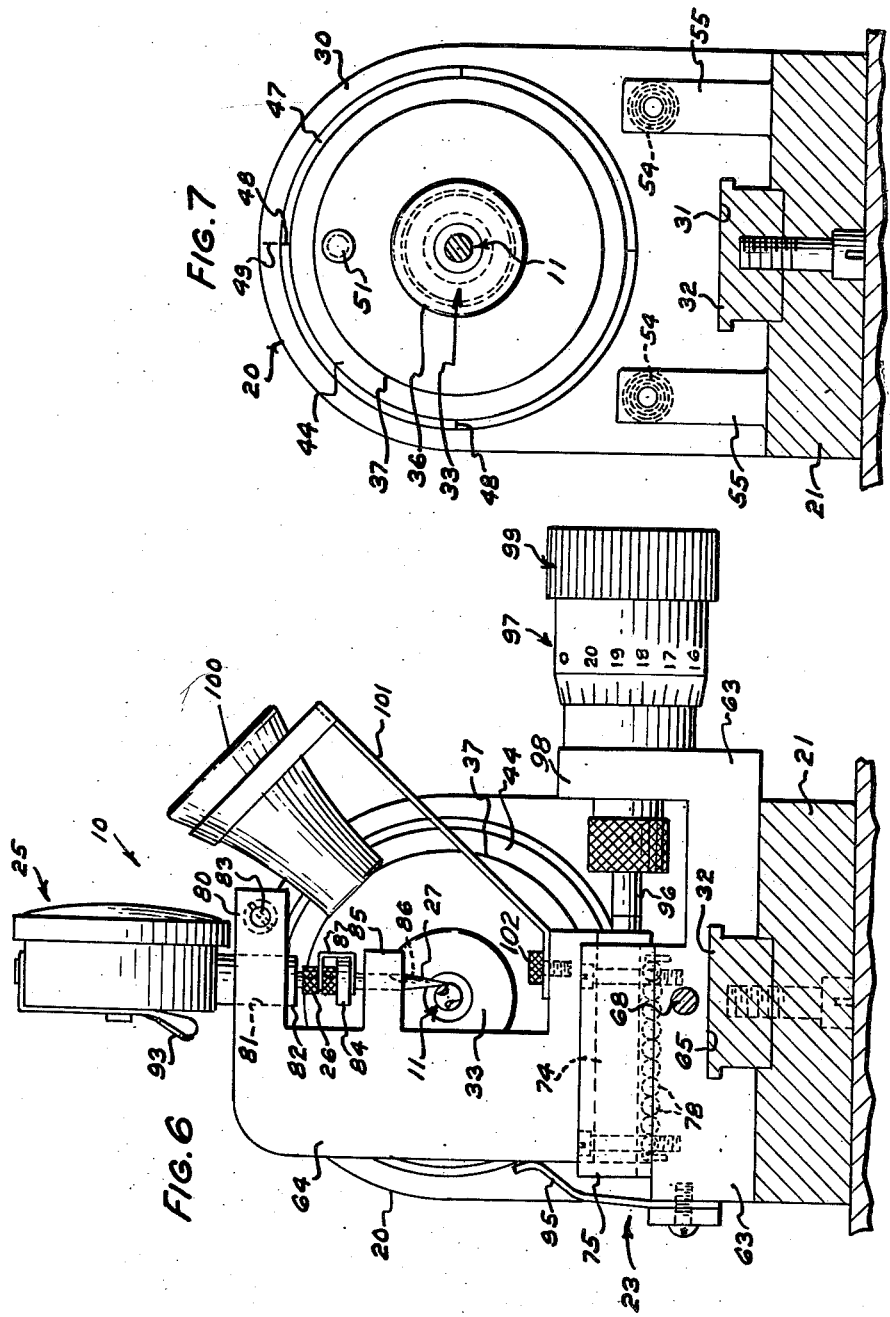

United States Patent Office 2,800,722
Patented July 30, 1957

2,800,722
DEVICE FOR DETERMINING THE CUTTING FACE ANGLES ON TAPS

Earl Hart, Downers Grove, Ill., assignor to Western Electric Company, Incorporated, New York, N. Y., a corporation of New York Application February 25, 1954, Serial No. 412,545

13 Claims. (Cl. 33—201)

This invention relates to a device for checking the cutting face angles on taps and more particularly to a gage for determining the chord angle hook of spiral pointed taps.

In the art of tapping threads in parts made from different materials of various degrees of hardness it is well known that for efficient operation of the taps the hook or rake angles thereof should vary according to the material being tapped. It is desirable therefore to have a device for non-destructively checking the hook angle of taps to make more effective use thereof.

An object of the present invention is to provide a gage for checking the cutting face angles of taps.

Another object of the invention is to provide a device for measuring the relationship of portions of a tap to determine the hook or rake angle thereof.

One way of establishing the hook of a tap is to determine the chord angle of a selected tooth thereof, the chord angle being the angle between the cutting centerline which passes through the axis of the tap and the crest of the tooth, and the chord of the flute arc which passes through the crest and the root of the tooth.

A device illustrating certain features of the invention for determining the chord angle of taps may include a rotary holder for supporting a tap for rotation about its axis in a horizontal plane, a dial indicatod for registering the movement of a stylus associated therewith and engageable with the tap, a post for supporting the dial indicator and stylus for movement of the stylus in a vertical direction, and means for supporting the post and the tap holder for movement of one relative to the other in a first horizontal direction longitudinally of the tap and in a second horizontal direction perpendicular to the axis of the tap, whereby the tap may be supported with the crest of a selected tooth disposed in a horizontal plane passing through the axis of the tap, the end of the stylus positioned in engagement with the crest of the tooth and the dial indicator registering "0," after which the dial indicator and stylus are moved horizontally transversely of the tap a distance equal to the depth of the tooth, which horizontal distance is one side of a right triangle and the stylus is then moved in said vertical direction into engagement with the fluted surface of the tap at the base of the tooth and the vertical distance traveled by the stylus is shown on the dial indicator and is another side of the right triangle, the hypotenuse of which is the chord of the flute arc passing through the crest and the base of the selected tooth. From the measurements thus obtained the chord angle of the tooth may be computed, or determined from prepared charts.

Other objects and advantages of the invention will become apparent by reference to the following detailed description and the accompanying drawings illustrating a preferred embodiment thereof, in which Fig. 1 is a plan sectional view of the device showing a tap therein;

Fig. 2 is an enlarged fragmentary plan view of the end portion of the tap shown in Fig. 1;

Fig. 3 is a cross-sectional view of the tap taken along the line 3—3 of Fig. 2;

Figures 4, 5:
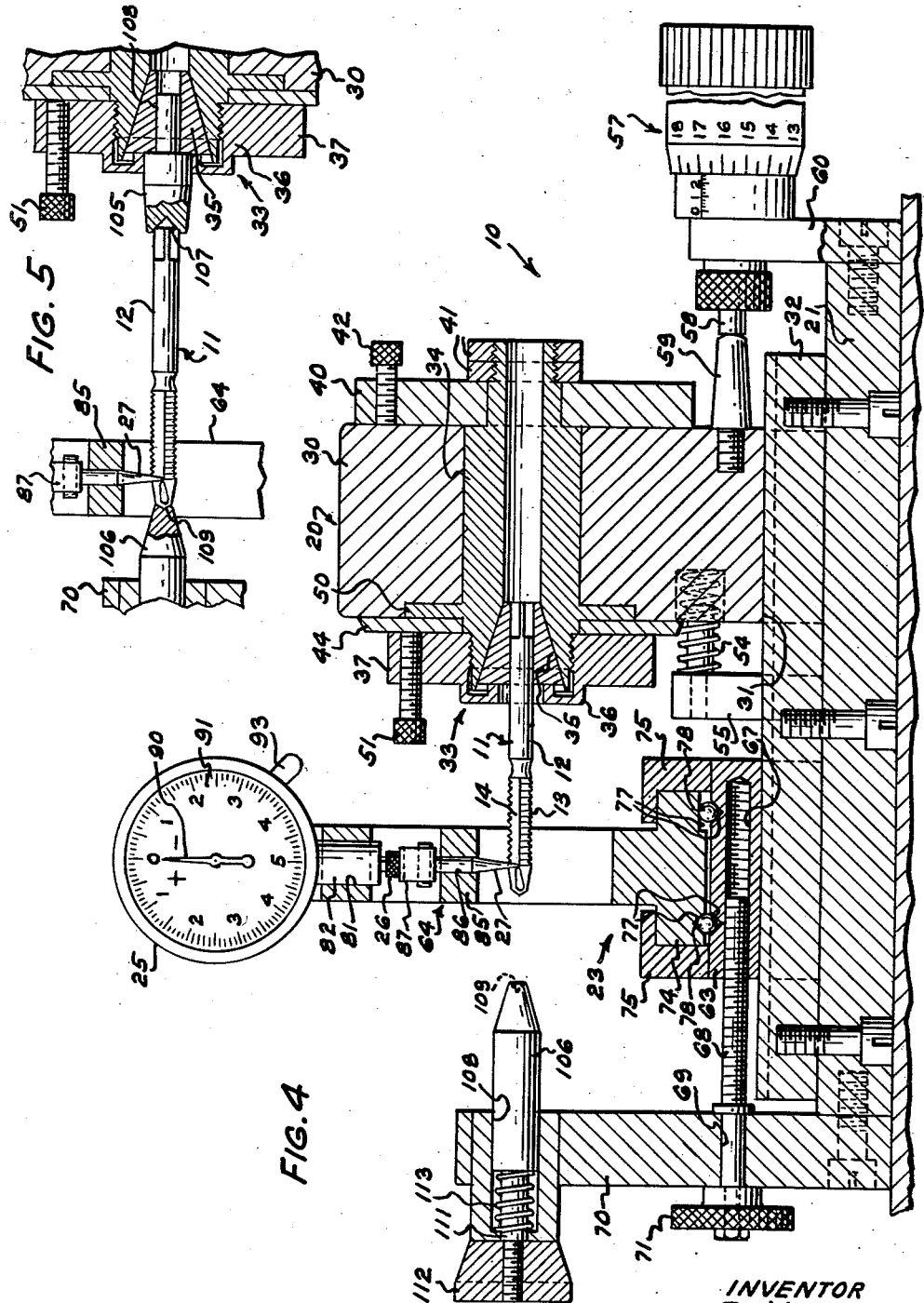
Fig. 4 is a vertical longitudinal sectional view through the device taken along the line 4—4 of Fig. 1.

Fig. 5 is a fragmentary view of the device showing another means for supporting the tap; and Figs. 6 and 7 are vertical cross-sectional views taken along the lines 6—6 and 7—7, respectively, of Fig. 1.

The present device 10 was designed to accurately measure the relationship of parts of the tap 11 to determine the hook or cutting face angle of the cutting teeth thereof. The tap 11 selected for illustration in connection with the disclosure of the device is a conventional tap having a cylindrical shank 12, a threaded portion 13 having a pair of opposed straight flutes 14, a chamfered portion 15, a pointed end 16, and a pair of spiral flutes 17 disposed at an angle to the axis of the tap.

The tap 11 is adapted to be supported in a chucking head 20 mounted on a base plate 21 on which is also mounted a compound cross slide 23 for supporting a dial indicator 25 for horizontal movement longitudinally and transveresly of the axis of the tap 11. The dial indicator has a plunger 26 and a stylus 27, which latter is guided for vertical movement for actuating the dial indicator and has a pointed lower end engageable with the tap for measuring the relationship of portions thereof.

The chucking head 20 comprises a block 30 provided with a T-slot 31 for receiving a T-shaped guide 32 therein secured to the base plate 21 for guiding the block 30 for longitudinal movement on the base. The block 30 is apertured for rotatably supporting a chuck 33 including a chucking sleeve 34 having a tapered forward end in which is positioned a suitable conical chucking element 35 apertured for receiving the shank of the tap 12 and operable for chucking the tap in response to turning movement of a nut 36 threadedly mounted on the end of the sleeve 34. The nut 36 has an enlarged annular portion 37 provided with a knurled outer surface to facilitate the tightening and releasing of the chuck. The opposite end of the chucking sleeve 34 is reduced for receiving a hand wheel 40 which is clamped by a pair of clamping nuts 41 against a shoulder formed on the sleeve 34. The outer periphery of the hand wheel 40 is knurled to facilitate the rotation of the sleeve 34 and the tap 12 therein and the wheel 40 has a locking screw 42 for locking the sleeve 34 against rotation.

To indicate the angular position of the tap 12, an annular dial 44 is mounted on the sleeve 34 between the nut 36 and a flange 45 on the sleeve 34. The dial 44 has a beveled edge on which a number of graduations 48 are marked and the dial is adapted to be rotated for registration of a selected one of the graduations 48 with an index line 49 on the block 30, and the dial 44 is adapted to be clamped in adjusted position against the flange 50 on the sleeve 34 by a locking screw 51 carried by the nut.

The chucking head 20 is mounted for limited longitudinal movement and is stressed for movement to the right as viewed in Figs. 1 and 4 by a pair of springs 54 seated in recesses in the block 30 and reacting against posts 55 fixed to the base plate 21. Movement in the opposite direction is imparted to the chucking head 20 by a micrometer 57 having an actuating spindle 58 engageable with a stud 59 fixed to the block 30. The micrometer 57 is supported in a bracket 60 fixed to the base plate 21 and by turning the micrometer, the chucking head 20 and the tap 11 may be very accurately adjusted longitudinally of the device 10.

The cross slide 23 comprises a base member or slide 63 mounted for longitudinal movement relative to the base 21 and the tap 11, and a dial supporting member or post 64 mounted on the slide 63 for transverse movement relative to the tap 11. The slide 63 has a T-shaped slot 65 for receiving the guide member 32 and has a threaded aperture 67 for receiving a threaded rod 68 which is mounted for rotation and against axial movement in a bearing aperture 69 in a bracket 70 secured to one end of the base plate 21. A knurled wheel 71 is fixed to the end of a threaded rod 68 by means of which the rod may be rotated to impart longitudinal movement to the compound cross slide 23 and the dial indicator 25.

At its lower end the dial indicator supporting post 64 is provided with an enlarged head 74 which is mounted for movement transversely of the tap 11 in a guideway formed by guide members or blocks 75 secured to the slide 63. The head 74 and the slide 63 are provided with cooperating V and flat ways 77 for receiving a plurality of ball bearings 78 therein for supporting the post 64 for reciprocable movement on the slide 63. A forwardly projecting split arm 80 on the upper end of the post 64 has a vertical aperture 81 for receiving a stem 82 of the dial indicator 25 and a screw 83 is provided for clamping the stem 82 and the dial indicator 25 in vertically adjusted position. A forwardly projecting arm 85 on the post 64 has a guide aperture 86 therein for engaging the cylindrical shank of the stylus 27 and guiding it for vertical movement.

The stylus 27 is separate from the plunger 26 of the dial indicator and has an enlarged head 84 which engages the lower end of the plunger 26 and is connected thereto by a U-shaped metal clip 87. The horizontally disposed end portions of the U-shaped clip 87 are slotted forming bifurcations, the upper ones of which engage in an annular groove in the end of the plunger 26 and the lower ones of which straddle the shank of the stylus 27 and engage the underneath surface of the head 84 thereof. This construction permits actuation of the dial in response to vertical movement of the stylus 27 without requiring the coaxial alignment of the stylus with the plunger 26. The lower end of the stylus 27 tapers to a point for establishing a point contact with portions of the tap.

The dial indicator 25 is of the balanced type having a pointer 90 rotatable in opposite directions in response to reverse movement of the stylus and having graduations and numerals 92 for indicating movement of the stylus in .0001″ and reading in opposite directions from a "0" (zero) position. The dial indicator 25 is clamped in adjusted position with the pointer 90 and the "0" mark of the dial disposed in a substantial vertical position and with the end of the stylus disposed in a horizontal plane passing through the axis of the tap and the chuck 33. This may be accomplished by placing a gage block (not shown) on the upper surface of the head 74 of the post 64, the upper surface of the gage blocks being in the plane of the axis of the tap 11 and the sleeve 34, and then adjusting the stylus 27 and the dial indicator 25 to its desired position as shown in Fig. 4, after which the gage block is removed from the device. The dial indicator 25 is of the type having mechanism including an actuating lever 93 operable to move the plunger 26 and the stylus 27 upwardly a predetermined distance to an inoperative position permitting ample clearance for the insertion and removal of the tap 11 relative to the chuck 33.

The tap may be supported by its ends in a head center 105 and a tail center 106 as shown in Fig. 5. The head center 105 has a tapered recess 107 at on end thereof for receiving one end of the tap 11 therein and has a shank 108 adapted to be clamped by the chucking element 35 for supporting the head center 105 in coaxial alignment with the chuck 33. The tail center 106 is mounted in a bore 108 in the bracket 70 in coaxial alignment with the axis of the chuck 33 and has a conical recess 109 for receiving the pointed end 16 of the tap 11. The tail center 106 has a reduced shank 111, the end of which is secured to a handle 112 by means of which the tail center may be moved to the left as viewed in Fig. 4 and a spring 113 disposed between the inner end of the tail center 106 and a shoulder in the bracket 70 urges the tail center for movement to the right.

The post 64 is urged by a spring 95 fixed to the slide 63 for movement in a forward direction (to the right as seen in Fig. 6) against the end of a spindle 96 of a micrometer 97 mounted on an upstanding lug 98 on the slide 63. Thus, by turning the knob 99 of the micrometer, transverse movement is imparted to the post 64 and the dial indicator 25 to accurately position the end of the stylus 27 relative to the tap 11. To facilitate the accurate location of the end of the stylus 27 relative to the tap a magnifying glass or a system of magnifying lenses 100 may be provided. As shown herein the magnifying lens is supported in a bracket 101 which is removably secured to the post 64 by a screw 102.

From the above description it will be seen that the tap 11 may be supported by its shank in the chuck 33 or by its ends between the head center 105 and the tail center 106, with the axis of the tap in a horizontal plane parallel to the face of the base plate 21 and that the compound cross slide 23 and the dial 25 thereon are movable relative to the tap in a horizontal plane in a first direction parallel to the axis of the tap and in a second direction transversely to the axis and that the stylus 27 is movable along a vertical path. Also as stated above the dial indicator 25 is mounted on the post 64.

With the tap 11 supported in the chuck 33 or in the head and tail centers, the device may be manipulated to measure the relation of portions of the tap for determining the chord angle 120 of the tap. The chord angle 120 is defined as the angle between the radial or cutting centerline 121 of the tap (Fig. 3) and the chord 122 of the flute arc which passes through the crest and the root of the selected tap tooth. The angle 120 is determined by forming a right triangle A, B, C, adjacent the tooth selected for measurement, with a point A on the crest of the selected tooth, with the point B spaced inwardly from the point A on the cutting centerline of the tooth a distance equal to the depth of the tooth, and with the point C on the flute arc at the root of the tooth. With the distance A—B known, it is only necessary to measure the distance B—C in order to calculate the chord angle. To measure the distance B—C on the tap with the present device, the chuck 33 and the tap 11 are oscillated and the longitudinal feeds 57 and 68 and the transverse feed 97 are manipulated to position the crest of the selected tooth in a horizontal plane passing through the axis of the tap and to position the end of the stylus 27 at point A on the crest of the tooth as shown in Fig. 3 in which position of the stylus the dial indicator registers "0." The stylus is then moved toward the axis of the tap a distance equal to the depth of the tooth, the end of the stylus riding along the surface of the flute arc 17 to the point C at which point the dial indicator registers the distance B—C, the distance between points B—C will be indicated by a positive movement of the pointer 90 in a counterclockwise direction if the angle is positive and the movement of the stylus is down from point B, and the movement of the pointer 90 will be in a clockwise direction and indicate a negative angle if the movement of the stylus is upward from point B. In the triangle A, B, C, with the distances A—B and B—C known, the cotangent of the angle and the measurement of the angle itself may be determined.

The device may also be used to determine if the crest of the two opposed sets of teeth of the tap are disposed 180° apart to check the balance or symmetry of the taps. For this purpose the device may be set up as shown in Figs. 3 and 4 of the drawings with the end of the stylus 27 in engagement with the crest of a selected tooth as shown in Fig. 3. With the parts of the device in this position the dial 44 is rotated relative to the chucking sleeve 34 to register a selected one of the graduations 48 with the index line 49, after which the lock screw 51 is turned to lock the dial 44 against the flange 50 of the chuck for rotation therewith. The lever 93 of the dial indicator 25 is actuated to raise the stylus 27, after which the chuck 33 and the tap 11 is rotated through 180° as indicated by the graduations 48 and the index line 49.

The tap 11 and chucking head are advanced a distance equal to one half the pitch of the tap by manipulation of the micrometer 57, after which the lever 93 is actuated to lower the stylus 27 onto the crest of the tooth positioned therebeneath and if the pointer 90 of the dial indicator registers at the "0" position the crests of the two opposed sets of teeth are disposed 180° apart. When taps larger than a predetermined size are to be tested it is necessary to move the stylus longitudinally beyond the end of the tap to permit the tap to be rotated after which the stylus is moved back to substantially its original position and into engagement with the crest of a tooth to be checked.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for determining the cutting face angle of a tap, means for holding a tap in a predetermined horizontal position, an indicating means having an element movable in a vertical direction, means for supporting the indicating means at zero position with said element in engagement with the cutting edge crest of a tooth of the tap in said predetermined horizontal position, and means for moving the tap and indicating means relative to each other a distance equal to the thread face depth of the tooth and in a horizontal plane and at right angles to the axis of the tap so that the indicating means engages the cutting face of the tooth at the root thereof to indicate the distance of vertical drop from the crest of said tooth.

2. A gage for measuring the hook angle of taps comprising a base, a tap holder, means on said base for supporting said holder and said tap for rotation about a substantially horizontal axis, means for locking said holder and tap against rotation, a dial indicator having a finger engageable with said tap, means on said base for supporting said dial indicator for horizontal movement transversely of the axis of said tap, and means for effecting relative axial movement between said supporting means and said tap holder.

3. A tap gaging device comprising a first means for supporting a tap, a dial indicator having a gaging element movable relative thereto into engagement with the tap, a second supporting means for supporting the indicator, a third means for supporting said first and said second means for diverse movements relative to each other in a plane parallel to the axis of a tap in said first means, said second means serving to guide the gaging element for movement in a straight path perpendicular to said plane, and means for effecting relative micrometric movement between said first and second means, whereby the gaging element and the tap may be moved relative to and into engagement with each other at predetermined points on the tap and measurements obtained of the relationship of portions of the tap for use in determining the hook angle thereof.

4. A tap gaging device comprising a first supporting mean for rotatably supporting a tap, means for rotating said tap, a dial indicator having a gaging element movable relative thereto into engagement with the tap, a second supporting means for supporting the indicator, a third means for supporting said first and said second supporting means for diverse movements relative to each other in a plane parallel to the axis of a tap in said first means, said second means serving to guide the gaging element for movement in a straight path perpendicular to said plane, and means for effecting relative micrometric movement between said first and second means, whereby the gaging element and the tap may be moved relative to and into engagement with each other at predetermined points on the tap and measurements obtained of the relationship of portions of the tap for use in determining the hook angle thereof.

5. A device for use in determining the hook angle of taps comprising a first holder for supporting a tap, an indicator having a gaging element movable relative thereto into engagement with the tap, a second holder for supporting the indicator and gaging element and for guiding the gaging element for rectilinear movement relative to the indicator, means for supporting said holders for diverse movement relative to each other in a plane parallel to said tap and perpendicular to the rectilinear movement of the gaging element, and means for effecting relative micrometric movement of the holders, whereby the gaging element and the tap may be moved relative to and into engagement with each other at predetermined points on the tap and measurements obtained of the relationship of portions of the tap for use in determining the hook angle thereof.

6. In a device of the type described, a first holder for supporting a tap in a predetermined position, a gaging element engageable with said tap, an indicator for indicating the movement of the gaging element, a second holder for supporting said gaging element and said indicator and for guiding the element for rectilinear movement transversely of the tap, means for supporting said first and said second holders for movement of one relative to the other longitudinally and transversely of the tap and transversely of the rectilinear movement of the gaging element, and means for moving one of said holders, whereby the gaging element and the tap may be moved relative to and into engagement with each other at predetermined points on the tap and measurements obtained of the relationship of said points for use in determining the hook angle of said tap.

7. In a device of the type described, an oscillatable holder for supporting a tap for turning movement about its axis, a gaging element engageable with said tap, an indicator for indicating the movement of the gaging element, a second holder for supporting said gaging element and said indicator and for guiding the element for movement relative to the indicator and transversely of the tap, means for supporting said oscillatable holder and said second holder for movement of one relative to the other longitudinally and transversely of the tap, means for turning said oscillatable holder, and means for moving one of said holders, whereby the gaging element and the tap may be moved into engagement with each other at predetermined points on the tap and measurements obtained of the relationship of portions of the tap for use in determining the hook angle thereof.

8. A device for use in determining the hook angle of taps comprising means for supporting a tap, a gaging element engageable with said tap, an indicator for indicating the movement of the gaging element relative thereto, means for supporting the gaging element and the indicator and for guiding the element for rectilinear movement relative to the indicator and transversely of the tap, means mounting said tap supporting means and said gaging element supporting means for movement of one relative to the other, means for effecting relative movement between said supporting means to permit relative movement between the tap and the gaging element in directions longitudinally and transversely of said tap and transversely of the movement of the gaging element whereby the gaging element and the tap may be moved relative to and into engagement with each other at predetermined points on the tap and measurements obtained of the relationship of said points for use in determining the hook angle of said tap.

9. A tap gaging device comprising a base, a holder on said base for supporting a tap, an indicator having a gaging element movable relative thereto enageable with the tap, supporting means on said base for supporting the indicator and gaging element for diverse movements in a plane parallel to the axis of a tap in said holder and for guiding the gaging element for movement perpendicularly to said plane, and means for actuating said supporting means to move said indicator longitudinally and transversely relative to the tap, whereby the gaging element and the tap may be moved into engagement with each other at predetermined points on the tap and measurements obtained of the relationship of portions of the tap for use in determining the hook angle thereof.

10. In a device of the type described, an oscillatable holder for supporting a tap for turning movement about its axis in a horizontal plane, a gaging element engageable with said tap, an indicator for indicating the movement of the element, a second holder for supporting said gaging element and said indicator and for guiding the element for vertical movement, means for supporting said oscillatable holder for turning movement about a horizontal axis and for supporting said first and said second holders for horizontal movement of one relative to the other longitudinally and transversely of the tap, means for turning said oscillatable holder, and micrometric means for effecting relative movement between said holders whereby the gaging element and the tap may be moved into engagement with each other at predetermined points on the tap and measurements obtained of the relationship of portions of the tap for use in determining the hook angle thereof.

11. A tap gaging device comprising a base, a holder rotatable about a predetermined axis for coxially supporting a tap for turning movement about said axis, means for rotating said holder, an indicator having a gaging element movable relative thereto engageable with the tap, a first means on said base for rotatably supporting said rotatable holder, a second supporting means on said base for supporting the indicator and gaging element for movement in a plane parallel to said axis and in directions longitudinally and transversely of said tap and for guiding the gaging element for movement perpendicular to said plane, and means for actuating said second supporting means to move said indicator longitudinally and transversely relative the tap, whereby the gaging element and the tap may be moved relative to and into engagement with each other at predetermined points on the tap and measurements obtained of the relationship of portions of the tap for use in determining the hook angle thereof.

12. A device for checking the angular spacing of the rows of teeth of taps comprising a holder for said tap, means for supporting said holder for rotation about the axis of a tap supported thereby, means for turning said holder, means associated with said holder and said supporting means for indicating the angular movement of the holder and tap therein relative to the supporting means, a gaging element engageable with said tap, an indicator for indicating the movement of the gaging element, means for supporting the gaging element and the indicator and for guiding the element for rectilinear movement transversely of the tap, means for supporting said gaging element and indicator supporting means for movement relative to said tap supporting means, and means for moving said gaging element and indicator supporting means longitudinally and transversely relative to said tap and perpendicular to the rectilinear movement of the gaging element, whereby the holder and the tap may be indexed successively through predetermined arcuate movements corresponding to the specified angular spacing of the rows of teeth of the tap and the gaging element moved into engagement with the crest of a selected tooth of each of said successive rows of angularly disposed teeth of the tap and the positions thereof checked on the indicator.

13. A device for checking the angular spacing of the rows of teeth of taps comprising means for supporting and turning a tap about its axis, means for indicating the angular movement of said tap supporting means and the tap supported thereby, an indicator having a gaging element movable through a predetermined path and engageable with said tap, means for supporting the indicator and the tap supporting means for movement relative to each other and for movement of the gaging element transversely of the tap, and means for moving said indicator longitudinally and transversely of said tap supporting means and a tap supported thereby and transversely of the path of movement of said gaging element whereby the tap may be indexed successively through predetermined arcuate movements corresponding to the specified angluar spacing of the rows of teeth of the tap and the gaging element moved into engagement with the crest of a selected tooth of each of said successive rows of teeth and the positions thereof checked on the indicator.

References Cited in the file of this patent

UNITED STATES PATENTS

| 2,577,228 | Carlson | Dec. 4, 1951 |
| 2,648,138 | Gase | Aug. 11, 1953 |

FOREIGN PATENTS

| 619,626 | Germany | Oct. 8, 1935 |
| 876,855 | France | Nov. 19, 1942 |